United States Patent Office 3,352,782
Patented Nov. 14, 1967

3,352,782
LUBRICATING COMPOSITIONS CONTAINING POLYAMINE SALTS
Jay Brasch, Elizabeth, N.J., assignor to Esso Research and Engineering Company, a corporation of Delaware
No Drawing. Filed Nov. 22, 1963, Ser. No. 325,757
12 Claims. (Cl. 252—47.5)

This invention relates to a new class of compounds which are the reaction products of polymeric chlorosulfates and amines (which products are hereinafter referred to as organic amido sulfates), to methods of preparing said compounds, and to petroleum compositions which contain said compounds.

BACKGROUND

Recently, various nitrogen-containing derivatives of high molecular weight alkenyl succinic anhydrides have become known as sludge dispersants or detergents for lubricating oils. See, for example, U.S. Patent Nos. 3,018,247; 3,018,250 and 3,018,291. (These patents are incorporated herein by reference.) One particularly effective derivative of this general type is prepared by reacting an alkenyl succinic anhydride with, for example, a polyamine (e.g., tetraethylene pentamine) as is described in Australian patent application No. 63,803, filed Aug. 22, 1960. More recently, other derivatives of this general nature have also been proposed. For example, it has recently been proposed that additives of this general type can be improved in their sludge dispersing effectiveness by a two-stage process wherein the first stage is the reaction of a carboxylic acid with the polyamine to form a 2-imidazoline, which is then condensed with the alkenyl succinic anhydride in a second stage. Even more recently, it has been proposed to form an effective lubricant additive of this type by simultaneously reacting the carboxylic acid, the polyamine, and the alkenyl succinic anhydride. While all of these various prior art compounds are thought to be effective as lubricant additives, they all require the prior preparation of a succinic acid or anhydride derivative of an olefin polymer as a necessary step in their preparation. It is generally believed (by those skilled in this particular art) that the presence of the succinic acid or anhydride function is necessary to impart the desired properties in the ultimate lubricating oil additive.

DISCOVERY

It has now been discovered, and this discovery forms a basis of the present invention, that a new class of compounds may be prepared from these same olefin polymers without introducing the succinic acid or anhydride group. These new compounds are useful as detergents in lubricating oils and have been shown to be superior to many prior art additives which contain the succinic acid or anhydride function. In this respect, however, it is pointed out that all of the inventive compounds do not serve with equal efficiency. The performance of individual members of this class of compounds will vary according to their concentration, according to the menstruum employed, according to their individual structures, etc.

According to one aspect of the present invention, an olefin polymer (e.g., polyisobutylene) is reacted under chlorosulfating conditions (e.g., reacted with chlorosulfonic acid) to produce the corresponding chlorosulfate of the olefin polymer. This chlorosulfate is then reacted with an amine or polyamine or substituted amine to produce the corresponding amido sulfate. While not wishing to be held to any particular mechanism, it is believed that this process can be illustrated as follows:

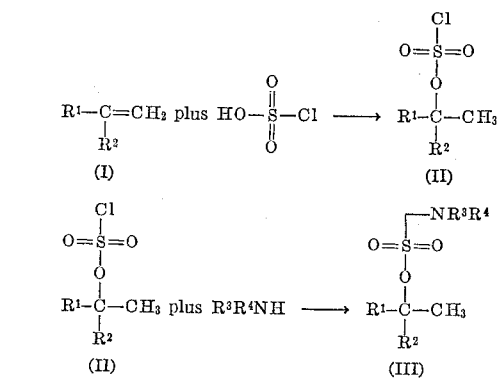

Here, an olefin polymer (I) is reacted with chlorosulfonic acid (or other chlorosulfating agent) to produce the corresponding chlorosulfate (II) which is then reacted with an amine to produce the corresponding amido sulfate (III).

$R^1$ is an organic group, usually aliphatic in character, and may be substituted or unsubstituted. $R^2$ may be H or an organic group, usually aliphatic in character, and may be substituted or unsubstituted. In the ordinary situation, $R^1$ and $R^2$ will be determined by the act of selecting an olefin polymer (as later described) to be used in the inventive process. $R^3$ may be H, alkyl, or $\pm(CH_2)_x-NH]_y-H$ wherein $x$ is preferably 2 or 3 and $y$ is 1 to 10, e.g., 1 to 5. $R^4$ may be H, alkyl, $-CN$, $-CONH_2$, $-C(CN)NH_2$, or $\pm(CH_2)_n-NH]_m-H$ wherein $n$ is preferably 1 to 3 and $m$ is 1 to 10, preferably 1 to 5. $R^3$ and/or $R^4$ may also be cyclic or heterocyclic groups (e.g., cyclohexyl or pyridyl groups). In some instances, $R^3$ and $R^4$ may be parts of a heterocyclic group of which the reactive amino (=NH) group is also a part, e.g., piperazine. Thus, it will be realized that almost any compound having a reactive amino group may be used. Obviously, however, some are preferred as will later be pointed out.

Where the starting polymer contains more than one degree of unsaturation (i.e., more than one double bond per polymeric molecule), additional chlorosulfate groups may frequently be introduced and then all or part of them may be reacted with an amine or mixtures thereof. Also, a polyamine (one having two or more reactive amino groups) may be reacted with one or two or more molecules of the chlorosulfated polymer. Consequently all of the inventive amido sulfates are thought to contain one or more of the following bonds:

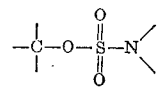

The final products are seldom known with any degree of certainty since many of the suitable reactants contain multiple possible reaction sites (e.g., tetrapropylene pentamine). Undoubtedly, the final product is, in many instances, a complex mixture of a number of compounds. Consequently, the inventive products can only be adequately described by describing the reactants used to produce them (e.g., the reaction product of polyisobutylchlorosulfate and tetraethylene pentamine).

It has been found that the inventive products (organic amido sulfates) are generally effective as detergent-dispersants in lubricating oils, although they do not all serve with equal efficiency. In this respect, however, some have been shown to be quite superior to conventional lubricating oil additives. For example, they are substantially superior to one known polyisobutenyl succinimide which is now available in commercial quantities. When an oil containing 0.6 wt. percent of that commercially available additive was compared under identical oxidative conditions for the same period of time with an identical oil containing 0.6 wt. percent of an inventive polyisobutylene amido sulfate prepared from polyisobutylene having a molecular weight of about 830, chlorosulfonic acid, and ethylene diamine, it was noted that the viscosity increase at 100° F. in SSU was approximately twice that encountered with the inventive amido sulfate, i.e., 375 SSU vs. 178 SSU. Copper, lead and silver corrosion, as measured at 340° F. for a specified period of time, was also reduced. For example, the copper/lead weight loss at 340° F. under a standardized test was 70 mg. for the commercial additive and 16 mg. for the inventive additive. When tested in the presence of silver, it was again noted that the inventive additive performed in an amazing manner. Here the weight loss was 3.7 mg. in the presence of the commercial additive and 0.4 mg. for the inventive additive. Similar outstanding results have also been obtained using a similar inventive additive prepared from polyisobutylene having a molecular weight of about 950.

POLYMERS

The organic polymers which may be used according to the present invention include those containing a total of about 30–250 and preferably 45–120 carbon atoms. These polymers (which may be homopolymers or heteropolymers) are commercially available and are normally obtained by polymerizing or copolymerizing olefins such as butadiene, isoprene, or $C_2$ to $C_5$ monoolefins. The resulting polymers will desirably have a molecular weight (Staudinger) of from about 400 to 3000, e.g., 600–1300. The olefin polymers may be either substituted (e.g., chlorinated or sulfurized) or unsubstituted, which substituents may also include hydrocarbon groups (e.g., aliphatic, aromatic, etc.). The polymers and copolymers of $C_2$ to $C_5$ alpha monoolefins are preferred. A particularly preferred example of such an olefin polymer is polyisobutylene. Since the method of polymerizing the olefins to form polymers thereof is immaterial in the formation of the new compounds described herein, any of the numerous processes available can be used to form such polymers.

CHLOROSULFATING AGENTS

The preferred chlorosulfating agent used according to the present invention is chlorosulfonic acid. Alternately, a mixture of fuming sulfuric acid and either dry hydrogen chloride, $PCl_3$, $PCl_5$, or $CCl_4$ may be employed although their use is less preferred.

AMINES

The amines which are useful according to the present invention include any compound having at least one reactive amino group. Obviously, some are better suited than others and they are preferred.

One preferred class of amines are the polyamines of the general formula:

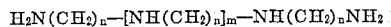

wherein $n$ is preferably two or three and $m$ is zero to ten, preferably 0 to 3. Examples of these polyamines which are operable in the present invention include diethylene triamine, tetraethylene pentamine, octaethylene nonamine, tetrapropylene pentamine, etc.

Another suitable class of amines are those represented by the formula:

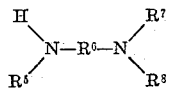

wherein $R^5$ is hydrogen or alkyl, generally from $C_1$ to $C_5$ alkyl. $R^6$ is a divalent alkylene radical and $R^7$ and $R^8$ are alkyl radicals.

Ordinarily $R^6$, $R^7$ and $R^8$ will contain a total of from 3 to 10 carbon atoms. $R^6$ can be the divalent ethylene radical, propylene radical, butylene radical, etc. It is preferred that $R^6$ contain three carbon atoms, that $R^7$ and $R^8$ each contain one carbon atom and $R^5$ is hydrogen or methyl radical. Such compounds include dimethylaminomethylamine, dimethylaminoethylamine, dimethylaminopropylamine, dimethylaminobutylamine, dimethylaminoheptylamine, diethylaminomethylamine, diethylaminopropylamine, diethylaminoamylamine, dipropylaminopropylamine, methylpropylaminoamylamine, propylbutylaminoethylamine, etc.

Alternatively, various other amines may be used such as ammonia, urea, ethylene diamine, melamine, guanidine, cyanamide, polymerized alkylenimines, methylamine, dicyclohexylamine, alkylenimines, dipyridylamine, piperazine, piperidine, di(octyl phenyl)amine, phenyl alpha naphthylamine, ethylamine, tetramethylenediamine, allylamine, aniline, amino imidazolines, etc. Particularly preferred are the amines having a nitrogen to carbon atomic ratio of from $\frac{1}{6}:1$ to $4:1$, e.g., $\frac{1}{2}:1$ to $3:1$. Even more preferred are amines of this type containing a total of less than 18 carbon atoms, e.g., from 2 to 14 carbon atoms such as ethylene diamine or tetraethylene pentamine.

PROCESS DESCRIPTION

It is preferred to conduct the reaction between the olefin polymer and the chlorosulfonic acid (or other chlorosulfating agent) in a step separate from that wherein the amine is reacted with the chlorosulfate. For purposes of illustration, only, the processes are hereinafter explained with particular reference to chlorosulfonic acid as the chlorosulfating agent.

In reacting chlorosulfonic acid with the olefin polymer, sub-atmospheric, atmospheric and super-atmospheric pressures may be employed. Pressure is not critical and its selection is well within the skill of those in the art. Consequently, atmospheric pressure is usually employed as a convenience. It is preferred to react the chlorosulfonic acid and the olefin polymer in the presence of a diluent, such as a mineral oil or a non-reactive organic solvent, e.g., heptane, hexane, nitrobenzene, the various dichlorobenzenes, etc. Benzene is not well suited for use as a diluent since it tends to enter into side reactions. The purpose of this diluent is to aid in the handling of the various reactants and to more readily achieve a homogeneous reaction mixture.

Mineral oils, especially those of lubricating oil viscosity, are the preferred diluents. If desired, the diluent may be omitted, although its use is preferred. Agitation of the reaction mixture is desirable. It is often convenient to use a slight molar excess of chlorosulfonic acid (based on one mole of polymer) to insure that the reaction between the olefin polymer and the chlorosulfonic acid goes to completion. If the olefin polymer contains more than one unsaturated bond, one may introduce more than one chlorosulfate group into the polymer. In such a situation, a mole equivalent excess should be used (i.e., more than one mole of chlorosulfating agent per double bond). The amount of excess chlorosulfonic acid employed may vary widely, however, and will be a function of the amount of diluent employed as well as the desired rate of reaction. For example, it has been found that it is possible to employ substantially equal molar amounts of chlorosulfonic acid and olefin polymer (e.g., polyisobutylene) and achieve substantially complete reaction. This technique has been accomplished in the laboratory. Where convenient, such a technique is preferred. Alternatively, 0.5 to 1.5 or 2 or 3 or even higher mole ratios of chlorosulfonic acid to olefin polymer may be employed. Particularly preferred are substantially equal molar amounts of acid and polymer (on the basis of one double bond per polymer molecule). The temperature of reaction will generally be below 100° C., usually from 0° to 50° C. and more usually from about 15° to about 30° C. Preferably the reaction temperature is maintained below about 30° C. since the reaction is exothermic and quite vigorous. This feature, while desirable, is not critical. The reaction is characterized by hydrogen chloride evolution which ceases shortly, especially if an, excess of chlorosulfonic acid is employed. Quite often the reaction mixture will be observed to turn red. Reaction times will usually be on the order of 0.5 to 12 hours, e.g., 1 to 4 hours.

When the reaction is complete, it may be desirable to neutralize any excess chlorosulfonic acid (e.g., with NaHCO₃) and remove the neutralized acid by conventional techniques, e.g., filtration. If, however, essentially equal molar amounts of the acid and the olefin polymer have been employed, it is often convenient to continue the present process without any such neutralization and separation steps.

The chlorosulfate of the olefin polymer prepared in the first stage of the present process is next reacted with an amine. Again, a diluent is preferably employed, which diluent may be the same one used in the chlorosulfating step. An excess of the amine may be employed to again insure that the reaction will go to completion. Also, an excess of the amine may be used to neutralize any excess acid present from the chlorosulfating step. However, where the amine is one that is not readily removed from the reaction mixture by conventional techniques (e.g., filtration, distillation, etc.) substantially equimolar amounts of amine and chlorosulfate may be used. When polyamines are used, an excess of the polymeric chlorosulfate may be used to react with 2, 3, or more amino groups thereby imparting greater thermal and hydrolytic stability to the inventive additive. Ordinarily, from 0.25 to 3.0 moles, e.g., 0.50 to 1.75 moles, of amine will be used per mole of chlorosulfated polymer. Sub-atmospheric, atmospheric, and super-atmospheric pressures may be employed in the second stage. Pressure is not critical and its selection is believed to be well within the skill of the routineer. Again, atmospheric pressure is usually employed as a matter of convenience. The amine will generally be added to the chlorosulfate at a temperature between 0° and 50° C., more usually from 20 to 40° C. although these temperatures are not critical. Temperatures below 50° C. are preferred, however. These low temperatures serve to moderate the rapid reaction that ensues between the amine and the chlorosulfate. Better control is thereby obtained. The course of the reaction is ordinarily followed by observing the color of the reaction mixture become more yellow. After the addition is complete, the reaction mixture of the amine and the chlorosulfate will generally be heated to between 50° and 200° C., more usually from 100° to 150° C., e.g., from 120° to 140° C. This heating insures completion of the reaction and also removes any low boiling substances such as excess amine, etc. Reaction times will generally be about 0.5 to 10 hours, more usually from 1 to 4 hours, e.g., 2 to 3 hours.

Upon completion of the reaction between the amine and the chlorosulfate (frequently indicated by a color change to bright yellow), the olefin polymer-amido-sulfate product may be removed from the crude reaction effluent. This may be accomplished, for example, by filtration (one or more times) through a filtering medium such as Dicalite, etc. Alternately, the reaction mixture may be neutralized, as for example, in a hydrocarbon solvent (e.g., heptane) with excess sodium carbonate. This neutralizing mixture is usually stirred vigorously for about 1 to 2 hours and then filtered. The filtrate will contain the inventive additive admixed with the diluent. The inventive additives can be recovered by vacuum distillation to remove the solvent or by any other method known to the art for solvent removal. Where mineral lubricating oil has been used as the diluent, its removal is frequently unnecessary. If desired, any excess unreacted material can be simply left in the final product. The product should contain less than 0.3 wt. percent chlorine, and preferably have a negligible chlorine content. The inventive additives are usually clear, brown, viscous liquids, soluble in all proportions in mineral oils and containing no free amine as shown by the absence of haze with an oil solution of zinc dialkyl dithiophosphate. Any or all of the various reactions discussed herein may be acomplished under an inert atmosphere and the product may be so stored.

Lubricating oil compositions will comprise a major proportion of oil of lubricating viscosity and from 0.001 to 20 wt. percent, preferably 0.1 to 10 wt. percent, e.g., 0.3 to 1.0 wt. percent, of the additive of the present invention as a sludge dispersant or detergent. Oil concentrates may contain proportionately higher concentrations of the additive, e.g., 20 to 80 wt. percent of the additive. For use in fuels (such as gasoline and fuel oil), as well as other normally liquid petroleum hydrocarbon compositions, amounts of from about 0.001 to 1.0 wt. percent of the inventive additive will generally be used. In every case, the amount of inventive product will be present in effective amounts ranging from more than incidental impurities.

The oil component of the lubricating oil compositions can be a mineral lubricating oil or a synthetic lubricating oil consisting of diesters such as di-2-ethylhexyl sebacate, complex esters, tetraesters, carbonate esters, polysilicone fluids, etc. For many of ordinary applications, mineral lubricating oils are preferred.

The lubricating compositions of the present invention may also include conventional lubricating oil additives in amounts of from 0.001 to 10.0 wt. percent and more usually from 0.1 to 4.0 wt. percent each based on the total weight of the entire composition. Such conventional additives include oxidation inhibitors such as phenothiazine and phenyl alpha naphthylamine; rust inhibitors such as sodium nitrite and sorbitan monooleate; anti-wear agents such as tricresyl phosphate and zinc dialkyl dithiophosphate; other dispersants or detergent additives such as phosphosulfurized polyisobutylene and basic calcium petroleum sulfonates; viscosity index improvers; pour depressants; dyes; etc.

The present invention will be further understood by reference to the following examples which include a preferred embodiment. Unless otherwise indicated, all parts are by weight and all percentages are weight percentages.

*Example 1*

A mixture of 830 grams (approximately 1 mole) of polyisobutylene and 400 grams of a mineral lubricating oil having a viscosity of 150 SUS at 100° F. as a diluent was treated dropwise with 116 grams (approximately 1 mole) of chlorosulfonic acid at a rate slow enough to enable the temperature to be kept below about 30° C. The pressure was atmospheric. The reaction mixture was stirred constantly for about two hours. When the reaction mixture became homogeneous (a red color), 75 grams (approximately 1.25 moles) of ethylene diamine was added dropwise so that the temperature was maintained below about 40° C. The pressure was atmospheric. The reaction mixture was stirred. The reaction mixture changed from a red color to yellow. After the color transition took place, the temperature was raised to about 150° C. to insure completion of the reaction and to evaporate any excess ethylene diamine. The total reaction time was about two hours. The remaining mixture (a bright yellow) was filtered through a filtering medium (Dicalite) while hot. The filtrate containing about 60 wt. percent of the inventive amido-sulfate (the other 40% being diluent) then free of excess ethylene diamine, was analyzed for nitrogen, sulfur and chlorine content. The nitrogen content was about 2 wt. percent, the sulfur content was about 3 wt. percent, and the chlorine content was negligible (all calculated on the weight of the inventive additive, only).

*Example 2*

The procedure of Example 1 was repeated using 950 gms. (approximately one mole) of polyisobutylene and 95 gms. (approximately 0.5 mole) of tetraethylene pentamine. The final reaction mixture was stirred at 120° C. for 2 hours, then filtered twice while hot through a filtering medium (Dicalite). The filtrate (containing about 80 wt. percent of the inventive amido sulfate and 20 wt. percent diluent), then free of any excess tetraethylene pentamine was analyzed. The nitrogen content was about 2.5 wt. percent and the sulfur content was about 1 wt. percent (all calculated on the weight of the inventive additive, only). The chlorine content was negligible.

Example 3

Lubricating oil compositions containing 0.9 wt. percent of the inventive additives were compared with a commercially available high detergent motor oil under identical test conditions. The testing technique was to run a test engine under specified conditions of load, engine speed, temperature, etc. and to examine and rate the sludge deposits on specified parts of the engine and sample the oil used at the indicated time intervals. Equal amounts of oil were used in each test and identical conditions were employed. Prior experience has shown that this test gives sludge deposits similar to those obtained in the operation of New York city taxi-cabs. Briefly described, a 6-cylinder engine is run at constant conditions of load and speed while cyclically changing the oil sump temperature until the desired total test time has elapsed. Fresh make-up oil is added as required so that the oil level at all times is maintained at a substantially constant level. The engine is initially inspected and then again at the end of each 21 hours of operation. This inspection is carried out by disassembling the engine sufficiently to visually examine the following parts for sludge:

Rocker arm cover
Rocker arm assembly
Cylinder head
Push rod chamber
Push rod chamber cover
Crankshaft
Oil pan Each part is visually rated on a numerical scale wherein 10 is perfectly clean and 0 is completely fouled. Numbers between 0 and 10 denote varying amounts of deposits. The ratings of the seven parts are then combined into a single merit rating.

The results of those tests are reported below. The merit ratings (which may vary from zero to ten) are given below under the various hours of test duration and reflect the cleanliness of the engine in question and thus reflect the ability of the various additives to reduce deposit formation.

TABLE I

| Oil | Merit Rating after indicated time | | | |
|---|---|---|---|---|
| | 0 hours | 42 hours | 63 hours | 84 hours |
| Commercial HD Motor Oil (mineral oil base) | 10 | 8.6 | 6.9 | 5.8 |
| Mineral Oil plus Inventive Additive of Example 1 | 10 | 9.9 | 9.2 | 8.9 |
| Mineral Oil plus Inventive Additive of Example 2 | 10 | ---------- | 9.4 | 8.9 |

In addition to having the extremely effective detergent dispersant properties as illustrated in Table I, the inventive additive shows a marked improvement in terms of oxidation inhibition and corrosion inhibition when contrasted with other commercially available detergent/dispersants. In Table II, infra various additives were added in 0.6 wt. percent concentration to a mineral lubricating oil (M.O.) and then tested in a standardized test (samples blown with air) under identical conditions.

TABLE II.—OXIDATION TEST RESULTS

| Oil | Viscosity Increase, SSU at 100° F., after 23 hrs. | Cu-Pb wt. loss, mg. | Average wt. loss, mg. |
|---|---|---|---|
| MO plus commercial alkenyl succinimide | 375 | 70 | 3.7 |
| Commercial heavy duty lube oil with a detergent, a detergent-inhibitor, and an anti-oxidant | 200 | 40 | (¹) |
| MO plus inventive additive of Example 1 | 178 | 16 | 0.4 |
| MO plus inventive additive of Example 2 | 134 | 17 | 0.5 |

¹ Not tested.

From Table II it can be seen that the inventive additives possess properties which are superior to those exhibited by comercially available premium products. Not only do the present additives possess the desired detergent/dispersant properties but they also enhance the corrosion resistance and oxidation resistance of the base oil.

The present invention having been described with a certain degree of particularity, it will be realized that various modifications and adaptation may be made within the spirit of the invention as hereinafter claimed. The various three-star headings used throughout this disclosure are not intended to be limiting, but are merely provided as a convenience to the reader. The true nature and scope of the present invention is indicated by the appendant claims.

What is claimed is:

1. A process for preparing an oil-soluble additive having sludge dispersing properties which comprises reacting 1 mole of the chlorosulfate of a $C_2$ to $C_5$ olefin polymer having a total of from 30 to 250 carbon atoms with from about 0.25 to 3.0 moles of a polyamine at a temperature in the range of from 0 to 200° C. for from about 0.5 to 10 hours, said polyamine being selected from the group consisting of ethylene diamine, an amine of the formula:

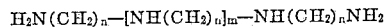

wherein $n$ is 2 to 3 and $m$ is zero to 10, and an amine of the formula:

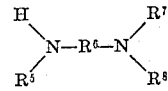

wherein $R^5$ is selected from the group consisting of hydrogen and $C_1$ to $C_5$ alkyl radical, wherein $R^6$ is a divalent alkylene radical, wherein $R^7$ and $R^8$ are alkyl radicals, and wherein the sum of the carbon atoms in $R^6$, $R^7$, and $R^8$ is from 3 to 10.

2. Process as defined by claim 1 including the step of preparing a chlorosulfate of said $C_2$ to $C_5$ olefin polymer by reacting said polymer with from 0.5 to 3 moles of chlorosulfonic acid at a temperature in the range of from 0 to 50° C.

3. Process as defined by claim 1 wherein said polyamine has less than 18 carbon atoms.

4. Process as defined by claim 1 wherein said chlorosulfate is the chlorosulfate of polyisobutylene of from 600 to 1300 molecular weight.

5. Process as defined by claim 1 wherein said polyamine is tetraethylene pentamine.

6. An oil-soluble additive having sludge dispersing properties which has been prepared by the process of claim 1.

7. An oil-soluble additive prepared by the process defined by claim 1 wherein said polyamine comprises tetraethylene pentamine.

8. An oil-soluble additive prepared by the process of claim 1 wherein said polyamine comprises ethylene diamine.

9. An oil-soluble additive prepared by the process of claim 1 wherein said chlorosulfate is the chlorosulfate of polyisobutylene of from 600 to 1300 molecular weight.

10. A concentrate of an additive which is capable of imparting sludge dispersing properties to a mineral lubricating oil composition when added thereto which comprises a mineral oil containing from 20 to 80 wt. percent of the additive product prepared by the process of claim 1.

11. A lubricating oil composition comprising a major amount of a lubricating oil and from 0.001 to 20 wt. percent of an oil-soluble additive prepared by the process of claim 1.

12. A normally liquid petroleum hydrocarbon composition containing a major proportion of a normally liquid hydrocarbon and from 0.001 to 20 wt. percent of an oil-soluble additive prepared by the process of claim 1.

References Cited
UNITED STATES PATENTS
2,367,468   1/1945   Mixon et al. _____ 252—33 X DANIEL E. WYMAN, Primary Examiner.

P. P. GARVIN, Assistant Examiner.